United States Patent

[11] 3,600,554

| [72] | Inventor | Glenn R. Bange |
| | | Pittsford, N.Y. |
| [21] | Appl. No. | 26,630 |
| [22] | Filed | Apr. 8, 1970 |
| [45] | Patented | Aug. 17, 1971 |
| [73] | Assignee | Sybron Corporation |
| | | Rochester, N.Y. |

[54] COOKING APPLIANCE HAVING A THERMALLY SENSITIVE BASE
8 Claims, 5 Drawing Figs.

[52] U.S. Cl. ............................................ 219/432,
219/435, 219/442, 219/447, 219/512, 99/329
[51] Int. Cl. ..................................................... F27d 11/02
[50] Field of Search............................................ 219/432,
433, 447, 430, 435, 439, 441, 442, 512, 543;
99/329, 367

[56] References Cited
UNITED STATES PATENTS
1,704,270  10/1927  Wells............................. 219/432

| 1,978,089 | 10/1934 | Jones............................. | 219/432 |
| 3,056,013 | 9/1962 | Hollerith........................ | 219/432 |
| 3,140,388 | 7/1964 | Perl................................ | 219/441 X |
| 3,440,404 | 4/1969 | Prescott......................... | 219/432 |

FOREIGN PATENTS

| 524,326 | 12/1953 | Belgium......................... | 219/432 |
| 658,148 | 10/1951 | Great Britain................. | 219/432 |

Primary Examiner—Volodymyr Y. Mayewsky
Attorney—Theodore B. Roessel

ABSTRACT: A cooking appliance including a cooking container having an exterior glass coating and an electric heating element encapsulated in the glass coating along the bottom of the container. An electric supply and control console adapted to accommodate one or more cooking containers having a container supporting platform made of a heat conducting material with a thermostat thermally coupled to the undersurface of said supporting platform so that with the container resting on the platform, the electric element is located between the container and the thermostat.

PATENTED AUG 17 1971 3,600,554

INVENTOR.
GLENN R. BANGE
BY
ATTORNEY

INVENTOR.
GLENN R. BANGE
BY
ATTORNEY

3,600,554

COOKING APPLIANCE HAVING A THERMALLY SENSITIVE BASE

BACKGROUND OF THE INVENTION

The present invention relates generally to electric cooking appliances wherein the heating elements are incorporated into the cooking container and, more specifically, to such a cooking appliance having an improved temperature control means.

Electric cooking appliances having self-contained heating elements with detachable temperature regulating means are well known in the art, for example, U.S. Pat. No. 2,834,868 and 2,926,230 are illustrative of such devices. These devices have several drawbacks. For example, it is difficult to establish a good thermal connection between the detachable thermostat and the cooking utensil so that the temperature indicated by the control device may not accurately reflect the temperature in the cooking utensil. Another drawback is caused by the practice of inserting the detachable thermostat at one side of the utensil which detracts from the accuracy of the temperature reading over the entire bottom of the utensil. Furthermore, the massive construction of the heating element and encapsulation causes a lag in the thermal response of the thermostat, and adds to the inaccuracy of the temperature control.

It is also well known in the art to provide a central unit for receiving one or more cooking utensils of the type described in the aforementioned patents. These central units or consoles have a support surface made of a heat insulating material and a plurality of electrical outlets for accommodating several of the cooking utensils at one time. U.S. Pat. Nos. 2,931,873 and 3,056,013 are illustrative of such devices. These devices while providing the convenience of accommodating several cooking utensils do not eliminate the temperature control problems inherent in the cooking utensils as described hereinabove.

An improvement in the construction of such a central console is afforded by incorporating the thermostat element into the cooking utensil as shown in U.S. Pat. No. 3,140,388. The primary drawbacks of such construction, however, are the added cost of encapsulating both the heating element and the temperature sensor into the body of the cooking container and the fact that it is difficult if not impossible to replace a defective or damaged thermostate in this type of construction.

These problems inherent in prior art constructions are overcome in the present invention by locating the temperature sensor below the support surface for the cooking utensil and by improving the thermalcoupling between the cooking utensil and the temperature sensor.

SUMMARY OF THE PRESENT INVENTION

The present invention may be characterized in one aspect thereof by the provision of a cooking container of relatively light gage metal which is provided with a glass coating on its exterior surface; a heating element encapsulated in the glass coating on the bottom surface of the container; a platform for supporting one or more of such containers wherein the platform is made of a heat conducting material and carriers the electrical outlet and controls for connection to the heating element of the cooking container; and a temperature sensing element fixed and thermally coupled to the undersurface of the support platform and positioned so as to locate the temperature sensor directly beneath the cooking container with the heating element of the container being located between the temperature sensor and the container cooking surface.

OBJECTS OF THE INVENTION

A primary object of the present invention is to provide an electric cooking apparatus which includes, in combination, a cooking container having a self-contained heating element and a support platform having electrical outlets for one or more such cooking containers with improved thermalcoupling between the cooking container and thermostat control.

Another object of the present invention is to provide an improved cooking appliance of the type described wherein the container support platform is made of a heat conducting material and the thermostat element is thermally coupled to the underside of the container support platform.

Yet another object of the present invention is to provide a cooking appliance of the type described wherein thermalcoupling between the cooking container and the thermostat is improved by having the thermal path between the heating element and cooking surface substantially equal to the thermal path between the heating element and thermostat.

A still further object of the present invention is to provide an improved cooking apparatus of the type described wherein the cooking container may have one or more heating elements therein and the support surface has an equal number of thermostat controls for maintaining different controlled cooking temperatures over different portions of the same cooking container.

Another object of the present invention is to provide an improved cooking apparatus of the type described wherein the cooking container has a glass coating on the exterior thereof with the heating element encapsulated in the glass coating.

These and other object, advantages and characterizing features of the present invention will become more apparent upon consideration of the following detailed description thereof when taken in connection with the accompanying drawings depicting the same.

DESCRIPTION OF THE PREFERRED EMBODIMENTS

Figure 1:
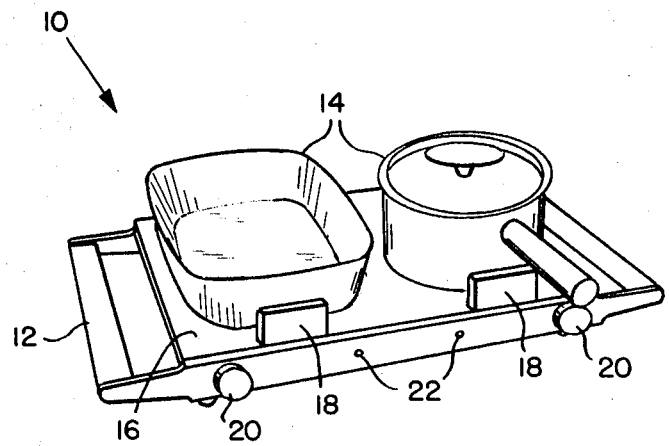
FIG. 1 is a pictoral representation of a cooking appliance embodying the present invention showing two cooking utensils in operation.

Referring to the drawings, FIG. 1 shows the cooking appliance embodying the present invention generally indicated at 10. The appliance includes a console 12 and one or more cooking containers 14. While the console is illustrated as being in a tray configuration, the invention should not be so limited and the console may be free standing and movable as, for example, the top of a cart on wheels or may be a permanent builtin counter unit.

Console 12 includes a base or container support platform 16, one or more electrical outlet housings 18 and a manually operated temperature setting device such as dials 20 associated with each electrical outlet. Any suitable indicator such as neon bulbs 22 may be provided for indicating when current is being supplied to electrical housings 18 and any suitable electrical plug connection (not shown) may be used to connect the console to a household electrical outlet for supplying current to the electrical housings. Base 16 is preferably made in one piece of a thin gage, heat conducting material such as aluminum. However, it is possible to have the base made in sections with only that section or portion of the base beneath the cooking utensil made of a heat conducting material.

Figure 3:
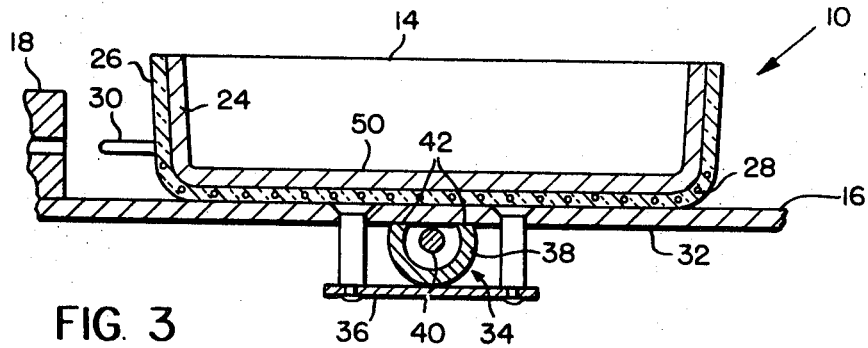
FIG. 3 is an enlarged view in cross section of the console support platform and cooking utensil embodying the present invention.

The construction of cooking containers 14 is better illustrated in FIG. 3 which shows each container as having a shell 24 constructed of a relatively, thin gage, heat-conducting metal and a glass coating 26 bonded to the exterior of the metal shell. Encapsulated within the glass coating is an electrical heating element 28 which supplies heat by conduction through glass coating 26 and metal shell 24 to the cooking surface represented by the reference 50. Methods of bonding glass coating 26 to both the exterior and interior of the metal shell and the encapsulation of the heating element within the coating on the exterior of the shell are well known in the art.

A male electrical terminal 30 extending from the heating element through the glass coating is provided for connection to the electrical terminal members of electrical outlet housings 18. The method for attaching these male terminals to the cooking utensil and heating element 28 is also well known, with a preferred method being described in copending U.S. Patent Application No. 762,039, filed Sept. 24, 1968, now U.S. Pat. No. 3,519,799.

Figure 5:
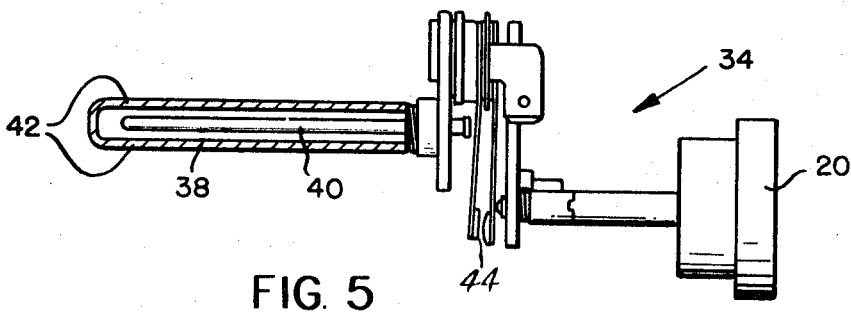
FIG. 5 is an enlarged view, partly in section of a typical thermostat element.

As stated hereinabove, base member 16 is constructed of a heat conducting material which preferably is a thin gage stock. Attached to the undersurface 32 of the base is the thermostat assembly which includes a thermostat element generally indicated at 34 and a suitable support bracket 36 for holding the thermostat against the undersurface 32 of container support platform 16. Thermostat 34 is a conventional probe type thermostat as made, for example, by American Thermostat Corporation, which has been modified for purposes of the present invention. Such a thermostat does not use a bonded bimetal strip but instead uses the linear differential expansion of two metals to open and close the contacts. One of the metals, of high expansion such as aluminum, forms the outer, probe element 38 and a low expansion metal forms the inner probe element 40. As shown in FIGS. 3 and 5, probe element 38 is tubular and has been machined along a cord thereof to form the relatively flat surfaces 42 which are held in intimate contact with the platform surface 32. The machining of the probe in this manner improves the thermalcoupling of the tubular element 38 to the heat conductive base 16. It is also within the skill of the art to modify the probe thermostat so that the outer probe element 38 is square in cross section. This would eliminate the need to mill the flat surfaces 42 as in the case of a tubular probe. Dial 20 as shown in FIG. 5 is used to turn the unit on and off and to set the desired temperature wherein the expansion differential between the outer probe element 38 and the inner element 40 acts to open and close contacts 44 to maintain the desired temperature.

Figure 4:
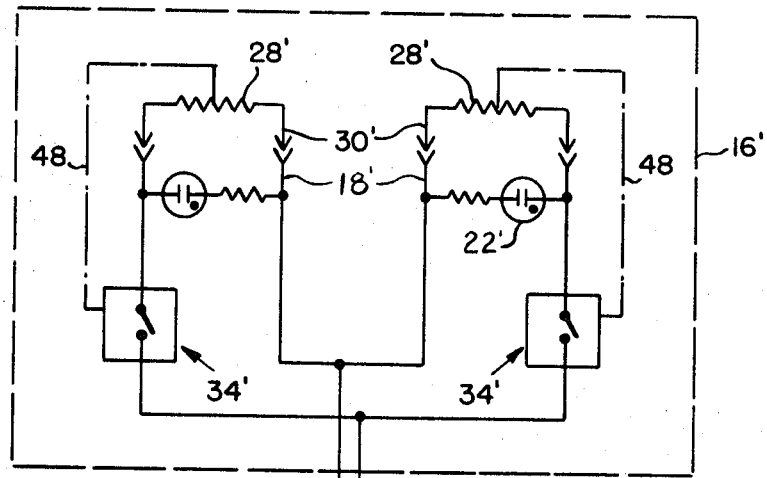
FIG. 4 is a schematic of the electrical circuit employed with a console having two thermostat units.

FIG. 4 show the schematic of the electrical circuit employed in the present invention. The dotted line 16' represents the console base or container support platform made of a heat conducting material on which the cooking utensils rest. In the circuit, resistance 28' represents the encapsulated heating element 28 (shown in FIG. 3). The reference 30' represents male terminals 30, the reference 18' represents the female terminals supported by the thermally sensitive base and 22' represents neon bulbs 22. One thermostat assembly 34' is associated with each heater circuit. The phantom line 48, represents the thermal link between the cooking utensil and the thermostat that is provided by the heat-conducting material of base 16.

In operation, then, and with the cooking utensil connected to electrical outlet housing 18, the thermostat element 34 may be set to the desired temperature by dial 20 to connect the resistance heating element 28 to the household current. As heating element 28 reaches the desired temperature, its heat is conducted through the heat conducting material of base 16 and along the thermal path 48 to the thermostat which then operates to open and close its contacts to maintain the desired temperature. One important feature of the present invention is that the heating element 28 as shown in FIG. 3 is disposed between thermostat assembly 34 and the utensil cooking surface 50. With this arrangement and with the thermostat assembly 34 located centrally beneath the cooking utensil, the thermal path between the heating element 28 and the thermostat is made as short as possible. This decreases the response time of the thermostat and, therefore, increases the accuracy of the control of the cooking temperatures. In this respect, heat from heating element 28 travels upwardly through glass 26 and metal shell 24 to cooking surface 50 through a path which is substantially equal in length to path of heat conducted downwardly through glass 26 and metal base 16 to the thermostat, so that the temperature at the thermostat accurately reflects the temperature of the cooking surface.

Figure 2:
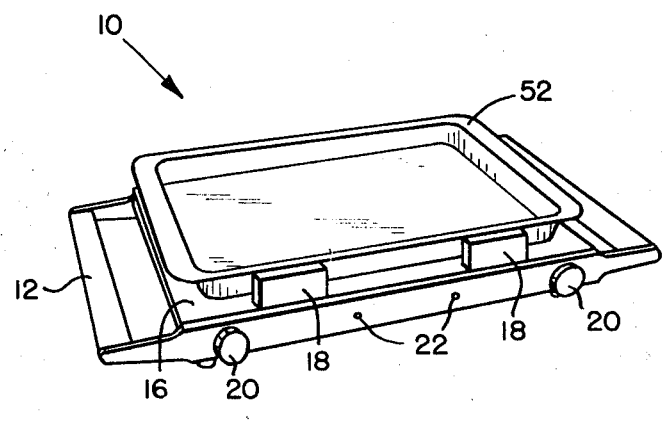
FIG. 2 is a view similar to FIG. 1 only showing one cooking utensil with two separate encapsulated heating elements.

A second embodiment of the present invention is illustrated by the cooking appliance shown in FIG. 2 wherein one large cooking utensil 52 is provided with two separate heating elements (not shown). Each heating element is provided with male terminals for connection to each of the electric outlet housings 18. With this arrangement, one temperature can be maintained on the left-hand side of the cooking utensil and another temperature maintained on the right-hand side of the cooking utensil so that food items which require different cooking temperatures, such as bacon and eggs, may be prepared in the same utensil.

Thus, it will be appreciated that the present invention accomplishes its intended objects, providing a cooking appliance which accurately maintains the desired temperature even though the heating element is encapsulated in the cooking container and the thermostat element is in the console supporting the cooking container. Having the base member or container support platform 16 of the console made of a thin gage, heat conducting material, insures that the thermostat beneath the support surface quickly senses temperature changes at the cooking surface. Further, locating the heating element between the cooking surface and thermostat and placing the thermostat directly beneath the heating element and making the path from the heating element to both the cooking surface and thermostat substantially equal in length, insures that the temperature at the cooking surface is substantially equal to the temperature at the thermostat.

Having thus described that invention, what I claim as new is:

1. An electric cooking appliance comprising in combination:
   a. a cooking container having
      i. a metallic shell,
      ii. a glass coating bonded to the exterior of said metallic shell,
      iii. an electric heating element encapsulated in said coating, and
      iv. male terminals for said heating element extending outwardly through said glass coating;
   b. a console having a platform, at least a portion of said platform being of a heat-conducting material, said heat-conducting portion adapted to support said container on the upper surface thereof with said container and heat conducting portion being in a heat-conducting relationship;
   c. an electrical outlet carried by said console adjacent said heat conducting portion for receiving the male terminals of said heating element;
   d. thermostat means fixed and thermally coupled to the lower surface of said heat conducting portion wherein said heat-conducting portion conducts heat through said platform from said heating element to said thermostat means; and
   e. adjustable control means for maintaining the temperature of said cooking container substantially constant at a preset value, said control means being operatively connected to and activated by said thermostat for regulating the current supplied to said electrical heating element.

2. An appliance as set forth in claim 1 having a plurality of electrical outlets with one thermostat and one control means associated with each outlet.

3. An appliance as set forth in claim 2 wherein said utensil has at least two heating elements encapsulated in said coating, each of said heating elements being associated with one of said thermostats and being independently controlled by one of said control means.

4. An appliance as set forth in claim 1 in which said thermostat means is a probe-type thermostat having the probe portion thereof fixed against the lower surface of said heat-conducting platform portion.

5. An appliance as set forth in claim 4 in which said probe-type thermostat has an outer tubular element provided with a flat surface and a bracket member fixed to the lower surface of said platform for holding said flat surface in intimate contact with the lower surface of said heat-conducting portion.

6. An appliance as set forth in claim 5 wherein said thermostat is centrally located beneath said encapsulated electric heating element.

7. An appliance as set forth in claim 5 wherein the path from said encapsulated heating element upward through said glass coating and metallic shell to the cooking surface of said container is substantially equal to the path from said encapsulated heating element downward through said glass coating and heat-conducting console portion to said thermostat.

8. An electric cooking appliance including a control unit for use with self-contained electrical heating element cooking utensils comprising:
   a. a support platform made of a heat-conducting material, the upper surface of said platform being adapted to receive and support a self-contained electrical heating element cooking utensil with said platform and utensil being in a heat-conducting relationship.
   b. an electrical outlet carried by and spaced above the upper surface of said platform for receiving the terminals of the self-contained electrical heating element in said utensil;
   c. a probe-type thermostat fixed in heat-conducting relationship to the lower surface of said support platform and centrally located beneath the electrical heating element of said utensil wherein heat is conducted through said platform from said utensil to said thermostate; and
   d. control means carried by said platform at one side thereof and activated by said thermostat for regulating the current supplied to said electrical outlet to maintain the temperature of said utensil at a substantially constant, preset value.